(12) United States Patent
Glav

(10) Patent No.: US 8,863,891 B2
(45) Date of Patent: Oct. 21, 2014

(54) DEVICE FOR DAMPING OF SOUNDS AND MOTOR VEHICLE COMPRISING SUCH A DEVICE

(75) Inventor: Ragnar Glav, Vallentuna (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/110,753

(22) PCT Filed: Apr. 12, 2012

(86) PCT No.: PCT/SE2012/050399
§ 371 (c)(1),
(2), (4) Date: Oct. 9, 2013

(87) PCT Pub. No.: WO2012/150896
PCT Pub. Date: Nov. 8, 2012

(65) Prior Publication Data
US 2014/0054105 A1 Feb. 27, 2014

(30) Foreign Application Priority Data

May 5, 2011 (SE) ...................................... 1150394

(51) Int. Cl.
| | | |
|---|---|---|
| *F02B 77/13* | (2006.01) | |
| *E04B 1/84* | (2006.01) | |
| *B60R 13/08* | (2006.01) | |
| *G10K 11/162* | (2006.01) | |
| *F04B 39/00* | (2006.01) | |
| *F02B 77/11* | (2006.01) | |
| *E04B 1/74* | (2006.01) | |

(52) U.S. Cl.
CPC ............. *F02B 77/13* (2013.01); *B60R 13/0884* (2013.01); *B60R 13/0838* (2013.01); *G10K 11/162* (2013.01); *F04B 39/0033* (2013.01)
USPC ......... 181/204; 181/290; 181/293; 180/69.22

(58) Field of Classification Search
CPC ...... F02B 77/13; B60R 13/08; B60R 13/0838; G10K 11/16; F01N 1/08; F01N 1/10; F01P 11/12; F24F 13/24; E04B 1/82; E04B 1/84
USPC ......... 181/204, 205, 225, 226, 290, 293, 200; 180/69.22, 69.23
See application file for complete search history.

(56) References Cited

U.S. PATENT DOCUMENTS 1,738,654 A   10/1925   James
(Continued)

FOREIGN PATENT DOCUMENTS

| DE | 1200007 | 9/1965 |
|---|---|---|
| DE | 25 08 522 A1 | 9/1976 |

(Continued)

OTHER PUBLICATIONS

International Preliminary Report on Patentability dated Jun. 17, 2013 issued in corresponding International patent application No. PCT/SE2012/050399.

(Continued)

*Primary Examiner* — Edgardo San Martin
(74) *Attorney, Agent, or Firm* — Ostrolenk Faber LLP

(57) ABSTRACT

Device for damping sounds which comprises a casing (11) around one or more sound-generating equipment items, and a sound-damping panel (20) via which air flows out from the casing. The sound-damping panel has a throughflow space (23) between a first wall (21) which faces towards the inside of the casing and a second wall (22) which extends along and at a distance from the first wall. The first wall has a plurality of apertures (24) for air to flow into the throughflow space. Diffusers (25) on the second wall directly opposite each aperture deflect the air which flows towards the second wall into various different directions in the throughflow space. At least some of the internal surfaces of the throughflow space are covered with sound-absorbing material (29). Air flows from the throughflow space to the surroundings via outlet apertures (31) of the sound-damping panel.

15 Claims, 3 Drawing Sheets

(56) References Cited

U.S. PATENT DOCUMENTS

| | | | |
|---|---|---|---|
| 3,132,714 A | | 5/1964 | Gary, Jr. et al. |
| 3,384,199 A | * | 5/1968 | Eckel .............................. 181/290 |
| 3,857,453 A | * | 12/1974 | Buttke et al. .................. 180/68.1 |
| 3,963,094 A | | 6/1976 | Nowikas |
| 4,122,908 A | * | 10/1978 | Miers et al. .................... 180/68.6 |
| 4,289,096 A | * | 9/1981 | Latham et al. ............. 123/198 E |
| 4,335,797 A | | 6/1982 | Simmons |
| 4,971,850 A | * | 11/1990 | Kuan-Hong .................. 428/137 |
| 5,665,943 A | * | 9/1997 | D'Antonio .................... 181/295 |
| 5,854,453 A | * | 12/1998 | Fujiwara et al. .............. 181/293 |
| 6,145,616 A | | 11/2000 | Ewanek |
| 7,644,803 B2 | * | 1/2010 | Hashizume .................... 181/225 |
| 7,743,880 B2 | * | 6/2010 | Matsumura et al. ........... 181/198 |
| 8,371,419 B2 | * | 2/2013 | Nonogi et al. ................. 181/290 |
| 2004/0200664 A1 | * | 10/2004 | Monson et al. ................ 181/224 |
| 2007/0272482 A1 | * | 11/2007 | Yamaguchi et al. ........... 181/290 |

FOREIGN PATENT DOCUMENTS

| | | | | |
|---|---|---|---|---|
| DE | 102010044224 A1 | * | 3/2012 | .............. B60R 13/08 |
| EP | 2631123 A1 | * | 8/2013 | .............. B60R 13/08 |
| JP | 48-100101-01 U | | 11/1973 | |
| JP | 52-132948 U | | 10/1977 | |
| JP | 60-122231 | | 6/1985 | |
| JP | 02102313 A | * | 4/1990 | ................. F01N 1/02 |

OTHER PUBLICATIONS

International Search Report dated Aug. 20, 2012 issued in corresponding International patent application No. PCT/SE2012/050399.

\* cited by examiner

DEVICE FOR DAMPING OF SOUNDS AND MOTOR VEHICLE COMPRISING SUCH A DEVICE

CROSS REFERENCE TO RELATED APPLICATIONS

The present applications is a 35 U.S.C. §§371 national phase conversion of PCT/SE2012/050399, filed Apr. 12, 2012, which claims priority of Swedish Application No. 1150394-3, filed May. 5, 2011, the contents of which are incorporated by reference herein. The PCT International Applications was published in the English language.

FIELD OF THE INVENTION AND PRIOR ART

The present invention relates to a device for damping of sounds generated by one or more sound-generating equipment items, and a motor vehicle comprising such a device.

Noise from motor vehicles, e.g. trucks and buses, is a notable social problem. A relatively easy and cost-effective measure for reducing the noise from a combustion engine of a motor vehicle is to shield the engine from the surroundings by means of a casing in order thereby to restrain the noise generated by the engine. Other sound-generating equipment items, e.g. a compressor driven by and/or a gearbox connected to the engine, may be enclosed in such a casing together with the engine. To maximise the noise-damping effect, the casing needs to be as tight as possible. However, to allow supply of air required for cooling the engine, the engine space enclosed by the casing has to be ventilated and the casing has therefore to be provided with inlets and outlets via which surrounding air is allowed to flow into and out from the casing. To prevent unacceptable sounds from making their way out of the casing via its outlets, the air may be led through a labyrinthine passage situated close to the casing outlet and so configured as to serve as a trap for the sounds but to allow air to pass through. A disadvantage of such a conventionally configured labyrinthine passage is that it results in a strong backpressure which hinders the circulation of air through the casing.

OBJECT OF THE INVENTION

The object of the present invention is to propose a device which is well suited to restraining noise from one or more sound-generating equipment items and which at the same time allows good air throughflow.

SUMMARY OF THE INVENTION

According to the present invention, said object is achieved by means of a device having the features defined in claim 1.

The device according to the invention comprises
- a casing intended to be placed round one or more sound-generating equipment items in order to shield them from the surroundings and thereby damp their sounds, which casing has an inlet via which air is allowed to flow into the casing, and
- a sound-damping panel which is situated in the casing and via which air is allowed to flow out from the casing.

The sound-damping panel comprises a first wall which faces towards the inside of the casing, and a second wall which extends along and at a distance from the first wall, leaving a throughflow space between the two walls. The first wall is provided with a plurality of apertures via which air is allowed to flow into said throughflow space between the walls, and a diffuser means is situated on the second wall directly opposite each aperture. Each diffuser means protrudes from the second wall towards the respective aperture in the first wall and is arranged to deflect the air which flows via that aperture towards the second wall so that this air flow is then led in various different directions in said throughflow space. At least some of the internal surfaces of said throughflow space are covered with sound-absorbing material. The sound-damping panel further has at least one outlet aperture which is connected to said throughflow space and via which air is allowed to flow from the throughflow space and proceed to the surroundings.

By suitable dimensioning of the apertures in its first wall and the distance between its first and second walls, the sound-damping panel can easily be arranged to provide the desired mass flow of air through the casing so that the backpressure caused by the panel is limited to a suitable level. The various diffuser means deflect the flow of air which makes it way, via the apertures in the first wall, into the space between the two walls so that it is led in various different directions in the throughflow space between the walls. This deflection by the diffuser means prevents the air flow from running straight at the second wall and thereby reduces the backpressure which occurs when the air passes through the apertures in the first wall into the space between the two walls. In the throughflow space the air flow is distributed over a large surface between the two walls and the acoustic energy of the sound waves which make their way into the throughflow space via the apertures in the first wall is absorbed by the sound-absorbing material situated on one or more internal surfaces of the throughflow space. Noise is thus intercepted and thereby prevented from making its way out from the casing to the surroundings. As air flows into the throughflow space via a plurality of apertures in the first wall and is deflected in various different directions by the diffuser means, it will flow in many different directions within the throughflow space and the various air flows will impinge upon one another and thereby generate a turbulent air flow within the throughflow space, making it easier for the sound-absorbing material to absorb the acoustic energy of said sound waves.

According to an embodiment of the invention, the side of the second wall which faces in towards the throughflow space is planar except for the regions of this side which are covered by said diffuser means, which means each take the form of a protrusion on this otherwise planar side of the second wall. The planar surfaces of the second wall facilitate the flow of air through the throughflow space and help to limit the backpressure caused by the sound-damping panel.

According to another embodiment of the invention, the side of the first wall which faces in towards the throughflow space is planar. The planar surfaces of the first wall facilitate the flow of air through the throughflow space and help to limit the backpressure caused by the sound-damping panel.

Other advantageous features of the device according to the invention are indicated by the dependent claims and the description set out below.

The invention relates also to a motor vehicle having the features of the invention.

BRIEF DESCRIPTION OF THE DRAWINGS

The invention is described below in more detail on the basis of embodiment examples with reference to the attached drawings, in which.

DETAILED DESCRIPTION OF EMBODIMENTS OF THE INVENTION

Figure 1:
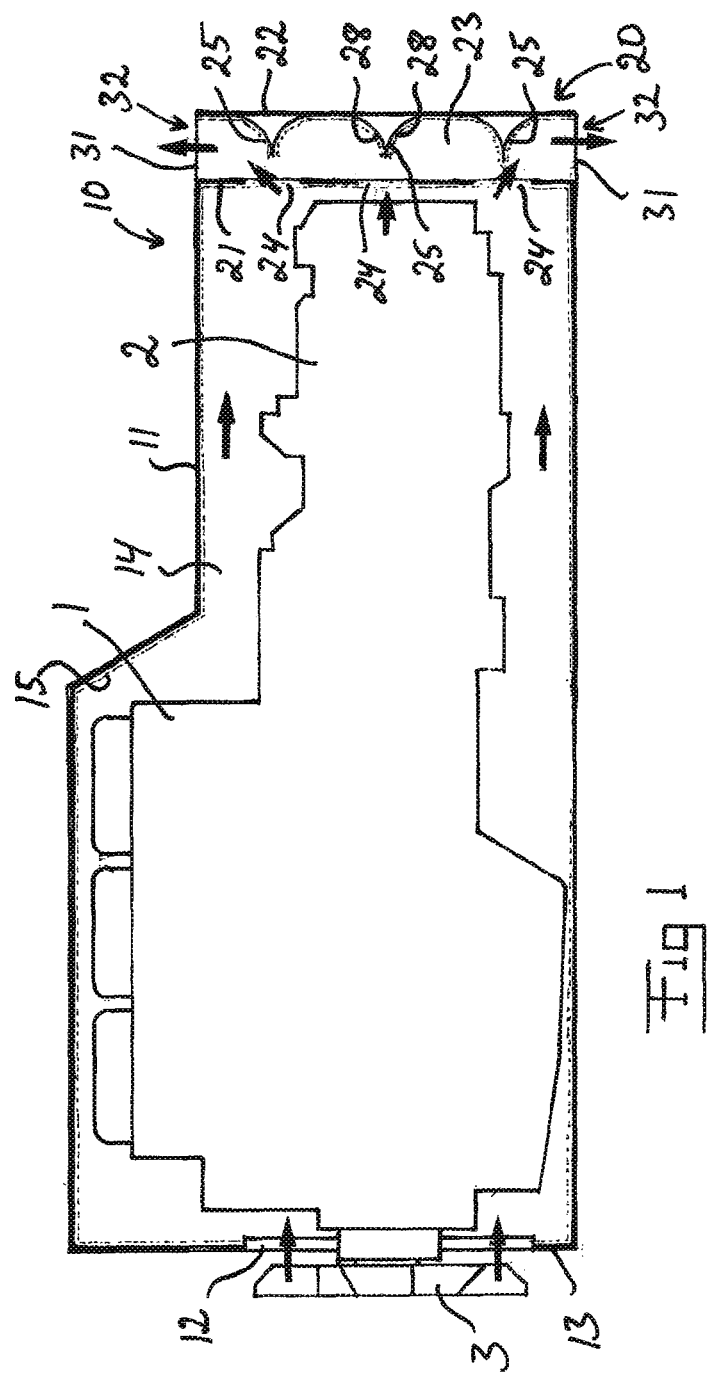
FIG. 1 is a schematic longitudinal section through a device according to an embodiment of the present invention with a combustion engine and a gearbox which are enclosed in the casing of the device.

FIG. 1 illustrates a device 10 for damping of sounds according to an embodiment of the present invention. The device 10 comprises a casing 11 intended to be placed round one or more sound-generating equipment items 1, 2 to shield them from the surroundings and thereby damp the sounds generated by them when they are in operation. In the example illustrated, a combustion engine 1 and a gearbox 2 of a motor vehicle are enclosed in the casing 11. The casing has an inlet 12 via which air is allowed to flow into the casing for cooling of the engine 1 and the gearbox 2. In the example illustrated a fan 3 driven by the engine is situated close to the casing inlet aperture 12 to generate a forced flow of air from the surroundings into the casing 11 via the inlet aperture. The internal wall surfaces of the casing are with advantage covered with sound-absorbing material 15, e.g. in the form of glass fibre wool, foam plastic, cotton or other fabric or some other suitable material with sound-absorbing characteristics.

The device 10 further comprises a sound-damping panel 20 which is situated in the casing 11 and via which air is allowed to flow out from the casing. In the example illustrated, the casing inlet aperture 12 is situated in the casing endwall 13 which faces forwards in the vehicle's normal direction of movement, whereas the sound-damping panel 20 is situated in or serves as a casing endwall which faces rearwards relative to the vehicle's normal direction of movement.

The sound-damping panel 20 comprises a first wall 21 which faces towards the inside of the casing, and a second wall 22 which extends along and at a distance from the first wall 21, leaving a throughflow space 23 between the two walls. In the embodiment depicted in FIGS. 1-3, the second wall 22 is situated directly opposite the first wall 21. The first wall is provided with a plurality of apertures 24 via which air is allowed to flow from the casing's internal space 14 into the throughflow space 23 between the walls 21, 22. These apertures 24 are spread over the first wall 21 and are with advantage circular or substantially circular with a diameter of 5-20 cm. They may however alternatively have some other shape and may for example be elliptical, square or rectangular.

A diffuser means 25 is situated on the second wall 22 directly opposite each aperture 24. Each diffuser means 25 protrudes from the second wall 22 towards the respective aperture 24 in the first wall 21 and is arranged to deflect the air which via the respective aperture 24 flows from the casing's internal space 14 towards the second wall so that this air flow is then led in various different directions in the throughflow space 23 between the walls 21, 22. The throughflow space 23 is open in all directions about each of the apertures 24 in the first wall 21 and the air flow in the throughflow space 23 is free to flow in all directions parallel with the walls 21, 22.

Each diffuser means 25 narrows from the second wall 22 towards the first wall 21 and is with advantage centred relative to the respective aperture 24 in the first wall 21. In the embodiment depicted, each diffuser means 25 has a tip 26 which points towards the respective aperture 24 in the first wall 21 and which is situated in a continuation of the centreline 27 of that aperture. In the embodiment depicted, the diffuser means 25 are also rotationally symmetrical.

Figure 2:
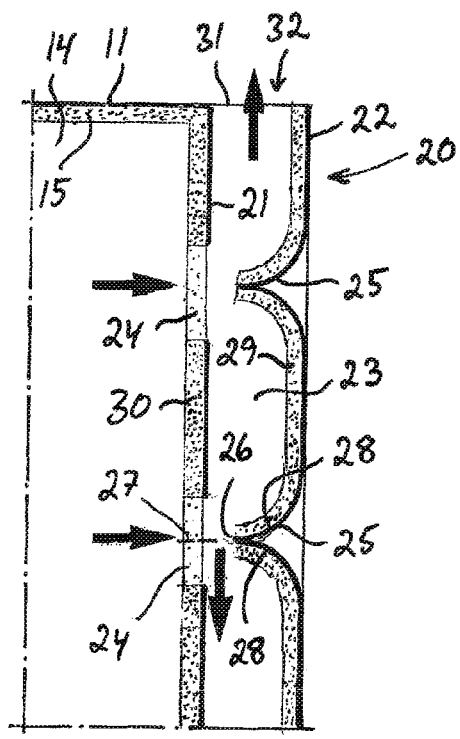
FIG. 2 is a schematic longitudinal section through part of a sound-damping panel which itself forms part of the device according to FIG. 1.

The side surfaces 28 of each diffuser means 25 are with advantage of concave shape as viewed in a longitudinal section through the diffuser means, as illustrated in FIGS. 1 and 2. The diffuser means 25 thus impart a gentle deflection to the aforesaid air flow. The side surfaces 28 of each diffuser means may however alternatively be straight and angled as viewed in a longitudinal section through the diffuser means. In this latter case the diffuser means 25 may for example be conical or pyramidal.

The side of the first and/or second walls 21, 22 which faces in towards the throughflow space 23 is at least partly covered with sound-absorbing material 29, e.g. in the form of glass fibre wool, foam plastic, cotton or other fabric or some other suitable material with sound-absorbing characteristics. In the embodiment depicted, the side of the second wall 22 which faces in towards the throughflow space 23 is covered with sound-absorbing material 29, whereas the first wall 21 is covered with sound-absorbing material 30 on its side which faces in towards the internal space 14 of the casing. With advantage, one or more of the diffuser means 25, preferably all of them, are covered with sound-absorbing material 29.

Figure 3:
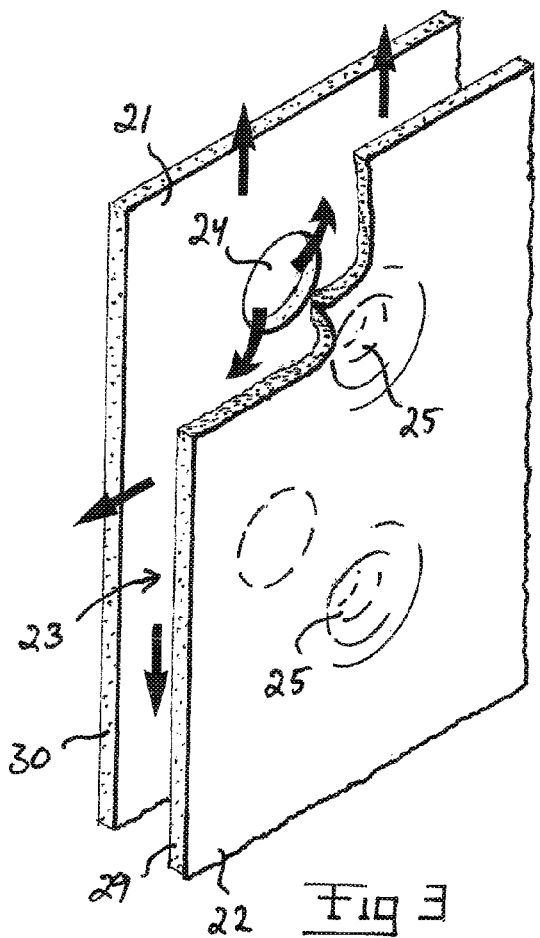
FIG. 3 is a schematic partly cutaway perspective view of part of the sound-damping panel according to FIG. 1.
Figure 4:
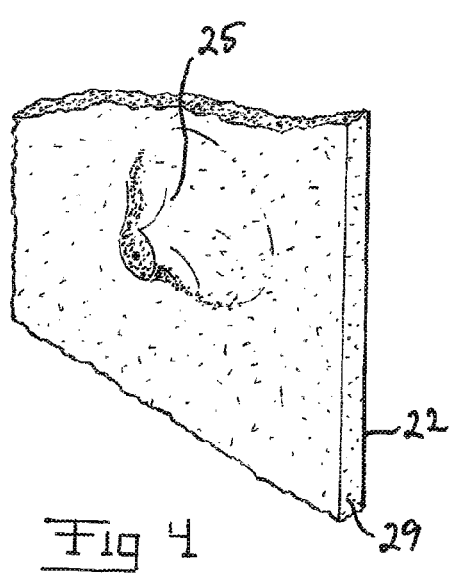
FIG. 4 is a schematic perspective view of a diffuser means which forms part of the sound-damping panel according to FIG. 1.

In the embodiment depicted in FIGS. 1-3, the side of the first wall 21 which faces in towards the throughflow space 23 is planar. The side of the second wall 22 which faces in towards the throughflow space 23 is also planar with the exception of the regions on that side which are covered by the diffuser means 25. Each diffuser means 25 constitutes a protrusion on this otherwise planar side of the second wall 22. The planar portions of the second wall 22 extend with advantage parallel with the first wall 21.

The sound-damping panel 20 comprises at least one outlet aperture 31 which is connected to the throughflow space 23 and via which air is allowed to flow from the throughflow space 23 and proceed to the surroundings. Each outlet aperture 31 is with advantage situated in a side edge 32 of the sound-damping panel 20 which extends between the first wall 21 and the second wall 2. The sound-damping panel 20 comprises with advantage two or more such outlet apertures 31 situated in two or more of its side edges. The combined cross-sectional area of the outlet apertures 31 is with advantage greater than or equal to the combined cross-sectional area of the apertures 24 in the first wall 21.

Figure 5:
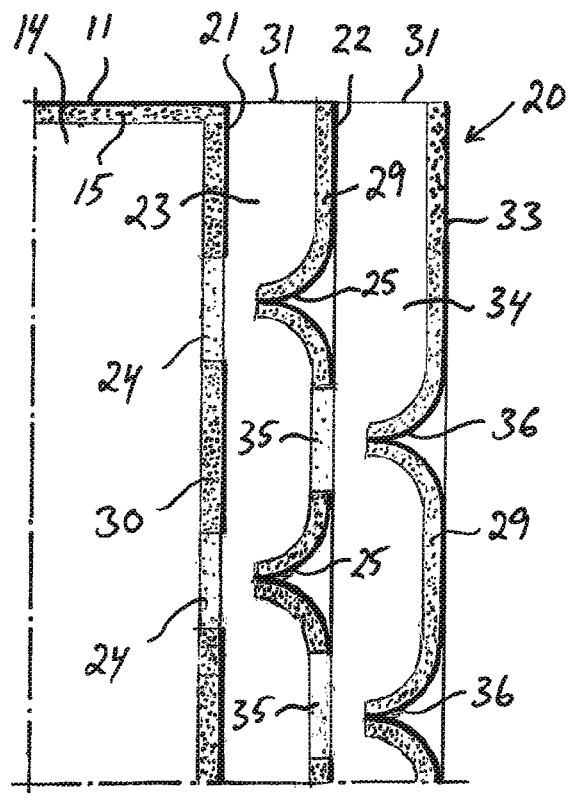
FIG. 5 is a schematic longitudinal section through part of a sound-damping panel according to an alternative configuration.
Figure 6:
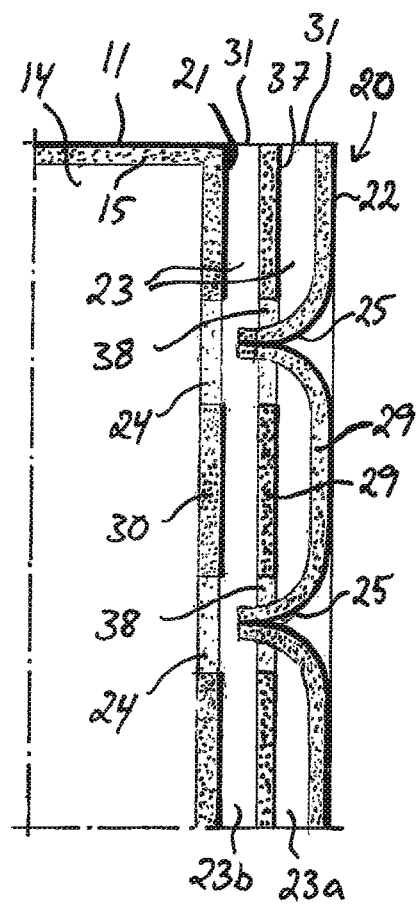
FIG. 6 is a schematic longitudinal section through part of a sound-damping panel according to another alternative configuration.

The sound-damping panel 20 which forms part of the device 10 might alternatively comprise one or more further walls in addition to the aforesaid first and second walls 21, 22, as in FIGS. 5 and 6.

FIG. 5 illustrates an alternative configuration of the sound-damping panel 20 comprising
- a first wall 21 facing towards the inside of the casing,
- a second wall 22 extending along and at a distance from the first wall 21 so as to leave a throughflow space 23 between the first wall 21 and the second wall 22, and
- a third wall 33 extending along and at a distance from the second wall 22 so as to leave a throughflow space 34 between the second wall 22 and the third wall 33.

The first wall 21 of the sound-damping panel depicted in FIG. 5 is configured in the same way as the first wall 21 of the sound-damping panel in FIGS. 1-3. A diffuser means 25 is situated on the second wall 22 directly opposite each aperture 24 in the first wall 21. Each diffuser means 25 protrudes from the second wall 22 towards the respective aperture 24 in the first wall 21 and is arranged to deflect the air which via this aperture 24 flows from the casing's internal space 14 towards the second wall so that this air flow is then led in various different directions in the throughflow space 23 between the first and second walls 21, 22. The throughflow space 23 is open in all directions about each of the apertures 24 in the first wall and the air flow in the throughflow space 23 is free to flow in all directions parallel with the first and second walls 21, 22. The second wall 22 is in this case provided with a plurality of apertures 35 via which air is allowed to flow from the throughflow space 23 between the first and second walls 21, 22 into the throughflow space 34 between the second and third walls 22, 33. These apertures 35 are offset relative to the apertures 24 in the first wall 21 and are with advantage circular or substantially circular with a diameter of 5-20 cm. The apertures 35 may however alternatively have some other shape and might for example be elliptical, square or rectangular. A diffuser means 36 is situated on the third wall 33 directly opposite each aperture 35 in the second wall 22. Each diffuser means 36 protrudes from the third wall 33 towards the respective aperture 35 in the second wall 22 and is arranged to deflect the air which via this aperture 35 flows from the throughflow space 23 between the first and second walls 21, 22 towards the third wall 33 so that this air flow is then led in various different directions in the throughflow space 34 between the second and third walls 22, 33. The throughflow space 34 is open in all directions about each of the apertures 35 in the second wall 22 and the air flow in this throughflow space 34 is free to flow in all directions parallel with the second and third walls 22, 33.

In the sound-damping panel depicted in FIG. 5, the side of the second wall 22 which faces in towards the throughflow space 23 and the side of the third wall 33 which faces in towards the throughflow space 34 are covered with sound-absorbing material 29. The diffuser means 25, 36 are likewise covered with sound-absorbing material 29. The planar portions of the second and third walls 22, 33 extend with advantage parallel with the first wall 21.

FIG. 6 illustrates an alternative configuration of the sound-damping panel 20 comprising
a first wall 21 facing towards the inside of the casing,
a second wall 22 extending along and at a distance from the first wall 21 so as to leave a throughflow space 23 between the first wall 21 and the second wall 22, and
a third wall 37 extending between and at distances from the first and second walls 21, 22 so as to divide said throughflow space 23 into a first portion 23a between the second wall 22 and the third wall 37 and a second portion 23b between the third wall 37 and the first wall 21.

The first and second walls 21, 22 of the sound-damping panel depicted in FIG. 5 are configured in the same way as the first and second walls 21, 22 of the sound-damping panel in FIGS. 1-3. A corresponding aperture 38 is situated in the third wall 37 directly opposite each aperture 24 in the first wall 21. Each aperture 38 in the third wall 37 is thus aligned with a corresponding aperture 24 in the first wall 21. Each diffuser means 25 extends through the respective aperture 38 in the third wall 37 towards the respective aperture 24 in the first wall 21 and is arranged to deflect the air which via this aperture in the first wall flows from the casing's internal space 14 towards the second wall 22 so that this air flow is then led in various different directions in the first and second portions 23a, 23b of the throughflow space 23 between the first and second walls 21, 22. The first portion 23a of the throughflow space 23 is open in all directions about each of the apertures 38 in the third wall 37 and the air flow in this portion 23a of the throughflow space is free to flow in all directions parallel with the second and third walls 22, 37. The second portion 23b of the throughflow space 23 is open in all directions about each of the apertures 24 in the first wall 21 and the air flow in this portion 23b of the throughflow space is free to flow in all directions parallel with the first and third walls 21, 37.

In the sound-damping panel depicted in FIG. 6, the side of the second wall 22 which faces in towards the first portion 23a of the throughflow space 23 and the side of the third wall 37 which faces in towards the second portion 23b of the throughflow space 23 are covered with sound-absorbing material 29. The diffuser means 25 are also covered with sound-absorbing material 29. The planar portions of the second and third walls 22, 37 extend with advantage parallel with the first wall 21.

The diffuser means 25, 36 of the sound-damping panels depicted in FIGS. 5 and 6 may be configured similarly to the diffuser means 25 described above of the sound-damping panel in FIGS. 1-3.

The device 10 according to the invention is particularly intended for use in a heavy motor vehicle, e.g. a bus, a tractor unit or a truck.

The invention is of course in no way restricted to the embodiments described above, since many possibilities for modifications thereof are likely to be obvious to one skilled in the art without therein having to deviate from the invention's basic concept such as defined in the attached claims.

the invention claimed is:
1. A device for damping sounds the device comprising:
a casing for being placed around sound-generating equipment and configured to shield the sound generating equipment from the surroundings and thereby to dampen sound generated, the casing including an inlet configured to allow air to flow into the casing for cooling;
a sound-damping panel in the casing, the sound-damping panel configured to conduct air out from the casing;
the sound-damping panel comprises:
a first wall, which faces an inside of the casing, and
a second wall, which extends along and at a distance from the first wall, and the second wall positioned so as to leave a throughflow space between the first wall and the second wall;
a plurality of apertures in the first wall via which air is allowed to flow into the throughflow space between the first and the second walls;
a diffuser situated on the second wall opposite each aperture of the plurality of apertures, and the diffuser having a curvilinear side protruding from the second wall towards the apertures in the first wall,
wherein the curvilinear side of the diffuser is configured for deflecting the air which flows from the apertures toward the second wall such that the air flow proceeds in various different directions in the throughflow space;
a sound absorbing material covering at least some of the internal surfaces of the throughflow space; and
the sound-damping panel comprises at least one outlet aperture connected to the throughflow space via which air flows from the throughflow space to the surroundings.
2. A device according to claim 1, wherein the sound-absorbing material at least partly covers a side of the first and/or second walls, the sound-absorbing material positioned to face in towards the throughflow space.

3. A device according to claim 1, comprising a plurality of diffusers, each diffuser of the plurality of diffusers positioned opposite a respective aperture of the plurality of apertures, the plurality of diffusers including the diffuser,
wherein a side of the second wall which faces in toward the throughflow space is planar except for regions on the side of the second wall covered by the diffusers and, the diffusers each comprise a protrusion on the otherwise planar side of the second wall.

4. A device according to claim 3, wherein the side of the first wall which faces in towards the throughflow space is planar.

5. A device according to claim 1, wherein the diffuser narrows from the second wall towards the first wall.

6. A device according to claim 5, wherein the side of the diffuser has side surfaces which are of concave shape as viewed in a longitudinal section through the diffuser.

7. A device according to claim 5, wherein the diffuser is rotationally symmetrical.

8. A device according to claim 1, wherein the diffuser is centered relative to the respective aperture in the first wall.

9. A device according to claim 1, wherein the diffuser has a tip which points towards a respective aperture of the diffuser in the first wall.

10. A device according to claim 3, wherein one or more of the diffusers is covered with a sound-absorbing material.

11. A device according to claim 1, wherein the sound-damping panel comprises a side edge positioned between the first wall and the second wall, and each outlet aperture is situated in the side edge of the sound-damping panel.

12. A device according to claim 1, wherein the sound-damping panel comprises two or more of the outlet apertures, each outlet aperture connected to the throughflow space and allowing air to flow from the throughflow space to the surroundings,
the sound damping panel comprising a first side edge and a second side edge opposite the first side edge, the first and second side edges each extending between the first and the second walls;
a first of the outlet apertures being situated in the first side edge of the sound-damping panel, and a second of the outlet apertures being situated in the second side edge of the sound-damping panel.

13. A device according to claim 1, wherein the apertures in the first wall are substantially circular with a diameter of 5-20 cm.

14. A motor vehicle provided with a combustion engine, the vehicle comprising a device according to claim,
wherein the combustion engine is enclosed in the casing of the device, and the casing is configured such that air is allowed to flow into the casing via the casing inlet and out from the casing via the sound-damping panel situated in the casing.

15. The device according to claim 1, wherein a combined cross-sectional area of the at least one outlet aperture is equal to or greater than a combined cross-sectional area of the plurality of apertures.

* * * * *